US012589656B2

(12) United States Patent
Bittinger et al.

(10) Patent No.: US 12,589,656 B2
(45) Date of Patent: Mar. 31, 2026

(54) TRAILER BRAKE GAIN BASED ON REGENERATIVE BRAKE CAPACITY

(71) Applicant: FCA US LLC, Auburn Hills, MI (US)

(72) Inventors: David S Bittinger, Fenton, MI (US);
Benjamin Abraham, Attica, MI (US);
Alexander Y Morita, Northville, MI (US)

(73) Assignee: FCA US LLC, Auburn Hills, MI (US)

( * ) Notice: Subject to any disclaimer, the term of this patent is extended or adjusted under 35 U.S.C. 154(b) by 74 days.

(21) Appl. No.: 18/616,280

(22) Filed: Mar. 26, 2024

(65) Prior Publication Data

US 2025/0303873 A1      Oct. 2, 2025

(51) Int. Cl.
*B60L 7/18*          (2006.01)
*B60T 8/17*          (2006.01)
*B60T 8/171*         (2006.01)

(52) U.S. Cl.
CPC .............. *B60L 7/18* (2013.01); *B60T 8/1708* (2013.01); *B60T 8/171* (2013.01)

(58) Field of Classification Search
CPC ........... B60T 7/18; B60T 8/1708; B60T 8/171
USPC .......................................................... 701/70
See application file for complete search history.

(56) References Cited

U.S. PATENT DOCUMENTS

| | | | | |
|---|---|---|---|---|
| 12,139,120 | B2 * | 11/2024 | Nguyen | .................... B60T 1/10 |
| 2025/0083651 | A1 * | 3/2025 | Shahriari | ................ B60T 8/172 |

* cited by examiner

*Primary Examiner* — Hai H Huynh
(74) *Attorney, Agent, or Firm* — Jeremy J. Klobucar

(57)          ABSTRACT

A dynamic braking system for an electrified vehicle having a high voltage (HV) battery system and an electric propulsion system includes a regenerative braking system configured to recharge the HV battery system, a vehicle controller configured to monitor and control the regenerative braking system to selectively perform a regenerative braking operation, and a vehicle brake actuator configured to selectively actuate one or more vehicle friction brakes. A brake controller is in signal communication with the vehicle brake actuator and configured for signal communication with a trailer brake actuator to selectively actuate trailer friction brakes. The brake controller is programmed to receive a driver braking request, receive a signal indicating a regenerative braking capacity of the electric propulsion system, and based on the driver braking request and the regenerative braking capacity, automatically adjust a trailer brake gain to (i) maximize energy recovery via regenerative braking and (ii) reduce brake wear.

15 Claims, 6 Drawing Sheets

TRAILER BRAKE GAIN BASED ON REGENERATIVE BRAKE CAPACITY

FIELD

The present application generally relates to electrified vehicles and, more particularly, to a regenerative braking system for electrified towing vehicles.

BACKGROUND

A powertrain is configured to generate and transfer torque to a driveline of a vehicle for propulsion. Some electrified powertrains include an electric motor configured for regenerative braking to recharge a high voltage battery. Further, vehicles utilized for towing a trailer often allow a user to manually set a trailer brake gain, which determines how hard the trailer brakes are applied during a vehicle braking operation. However, improper settings may lead to unnecessary wear on the trailer brakes or vehicle brakes. Accordingly, while such conventional electrified powertrain control systems do work for their intended purpose, there exists an opportunity for improvement in the relevant art.

SUMMARY

In accordance with one example aspect of the invention, a dynamic braking system for an electrified vehicle having a high voltage (HV) battery system and an electric propulsion system is provided. In one example implementation, the dynamic braking system includes a regenerative braking system configured to generate electrical energy to recharge the HV battery system, a vehicle controller configured to monitor and control the regenerative braking system to selectively perform a regenerative braking operation, and a vehicle brake actuator configured to selectively actuate one or more vehicle friction brakes. A brake controller is in signal communication with the vehicle brake actuator and configured for signal communication with a trailer brake actuator to selectively actuate one or more trailer friction brakes. The brake controller is programmed to receive a driver braking request; receive a signal indicating a regenerative braking capacity of the electric propulsion system; and based on the driver braking request and the regenerative braking capacity, automatically adjust a trailer brake gain to (i) maximize energy recovery via regenerative braking and (ii) reduce brake wear.

In addition to the foregoing, the described dynamic braking system may include one or more of the following features: wherein the brake controller is programmed to (i) automatically increase a trailer brake gain when the regenerative braking capacity decreases, to thereby reduce a vehicle brake pad wear, and (ii) automatically decrease the trailer brake gain when the regenerative braking capacity increases, to thereby maximize energy recovery via regenerative braking and reduce a trailer brake pad wear; and wherein the brake controller is programmed to first satisfy a maximum amount of the driver braking request via the regenerative braking as allowed by the regenerative braking capacity, then satisfy a maximum amount of any remaining driver braking request via the one or more trailer friction brakes, and finally satisfy any further remaining driver braking request via the one or more vehicle friction brakes.

In addition to the foregoing, the described dynamic braking system may include one or more of the following features: wherein the brake controller is programmed to continuously update the driver braking request and the regenerative braking capacity, and continuously adjust the trailer brake gain to continuously maximize energy recovery via regenerative braking; a brake pedal sensor in signal communication with the brake controller, wherein the brake controller is configured to receive one or more signals from the brake pedal sensor indicating the driver braking request, which represents a total brake demand; and wherein the brake controller is programmed to send a vehicle brake request to the vehicle brake actuator to generate a first portion of the total brake demand, send a trailer brake request to the trailer brake actuator to generate a second portion of the total brake demand, and send a regenerative braking request to the regenerative braking system to generate a third portion of the total brake demand.

In addition to the foregoing, the described dynamic braking system may include one or more of the following features: a user interface in signal communication with the brake controller, wherein the brake controller is configured to receive, from the user interface, one or more signals indicating a user selected brake gain; wherein the brake controller is configured to override the user selected brake gain when automatically adjusting the trailer brake gain; and wherein the brake controller is further programmed to continuously adjust a regenerative braking level of the regenerative braking system, to further maximize the power regeneration of the HV battery system via the regenerative braking system, based on regenerative braking capacity.

In accordance with another example aspect of the invention, a control method for a dynamic braking system for an electrified vehicle having a high voltage (HV) battery system and an electric propulsion system, the dynamic braking system including a regenerative braking system and a vehicle brake actuator is provided. In one example implementation, the method includes receiving, by a brake controller, a driver braking request; receiving, by the brake controller, a signal indicating a regenerative braking capacity of the electric propulsion system; and based on the driver braking request and the regenerative braking capacity, automatically adjusting, by the brake controller, a trailer brake gain to maximize energy recovery via regenerative braking, and reduce brake wear.

In addition to the foregoing, the described method may include one or more of the following features: wherein said automatically adjusting a trailer brake gain includes (i) automatically increasing, by the brake controller, a trailer brake gain when the regenerative braking capacity decreases, to thereby reduce a vehicle brake pad wear, and (ii) automatically decreasing, by the brake controller, the trailer brake gain when the regenerative braking capacity increases, to thereby increase energy recovery via regenerative braking, and reduce a trailer brake pad wear; and wherein said automatically adjusting a trailer brake gain includes (i) first satisfying, by the brake controller, a maximum amount of the driver braking request via the regenerative braking as allowed by the regenerative braking capacity, (ii) then satisfying, by the brake controller, a maximum amount of any remaining driver braking request via one or more trailer friction brakes, and (iii) finally satisfying, by the brake controller, any further remaining driver braking request via one or more vehicle friction brakes.

In addition to the foregoing, the described method may include one or more of the following features: continuously updating the driver braking request and the regenerative braking capacity, and continuously adjusting, by the brake controller, the trailer brake gain to continuously maximize energy recovery via regenerative braking; receiving, by the brake controller, one or more signals from a brake pedal sensor indicating the driver braking request, which represents a total brake demand; and sending, by the brake controller, a vehicle brake request to the vehicle brake actuator to generate a first portion of the total brake demand, sending, by the brake controller, a trailer brake request to a trailer brake actuator to generate a second portion of the total brake demand, and sending, by the brake controller, a regenerative braking request to the regenerative braking system to generate a third portion of the total brake demand.

In addition to the foregoing, the described method may include one or more of the following features: receiving, by the brake controller and from a user interface, one or more signals indicating a user selected brake gain; overriding, with the brake controller, the user selected brake gain when automatically adjusting the trailer brake gain; continuously adjusting, by the brake controller and based on the regenerative braking capacity, a regenerative braking level of the regenerative braking system, to further maximize the power regeneration of the HV battery system via the regenerative braking system.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, some vehicles include a regenerative braking system, as well as a manual brake gain feature for towing. However, inefficient use of these systems may lead to unnecessary wear on vehicle brakes and trailer brakes, particularly during braking while towing heavy loads.

Accordingly, described herein are systems and methods for dynamic vehicle/trailer braking to maximize regenerative braking energy and reduce brake wear while towing with an electric vehicle. In general, the systems are configured to automatically adjust trailer brake gain based on the regenerative brake capacity of the vehicle electric propulsion system. The system utilizes the most efficient and cost-effective actuators to slow/stop the vehicle and its trailer. For example, increasing the trailer brake gain when regenerative braking capacity is low will reduce early vehicle brake pad wear that occurs when the driver under-utilizes the trailer brakes at high load. Along the same lines, decreasing the trailer brake gain when regenerative braking capacity is high will allow for the most efficient recovery of energy and reduce early trailer brake pad wear that occurs when the driver over utilizes the trailer brakes at high load.

The described system is dynamic and continuously adjusts the regenerative strategy and trailer brake gain based on the vehicle regenerative braking capacity. With high regenerative braking capacity, trailer brake gain is automatically adjusted to its lowest setting needed to support vehicle and trailer stability while maximizing energy recovery. With low regenerative braking capacity, trailer brake gain is automatically increased to ensure vehicle friction brake durability. In this way, the system facilitates both maximum energy recovery and brake durability while towing a trailer.

Figure 1:
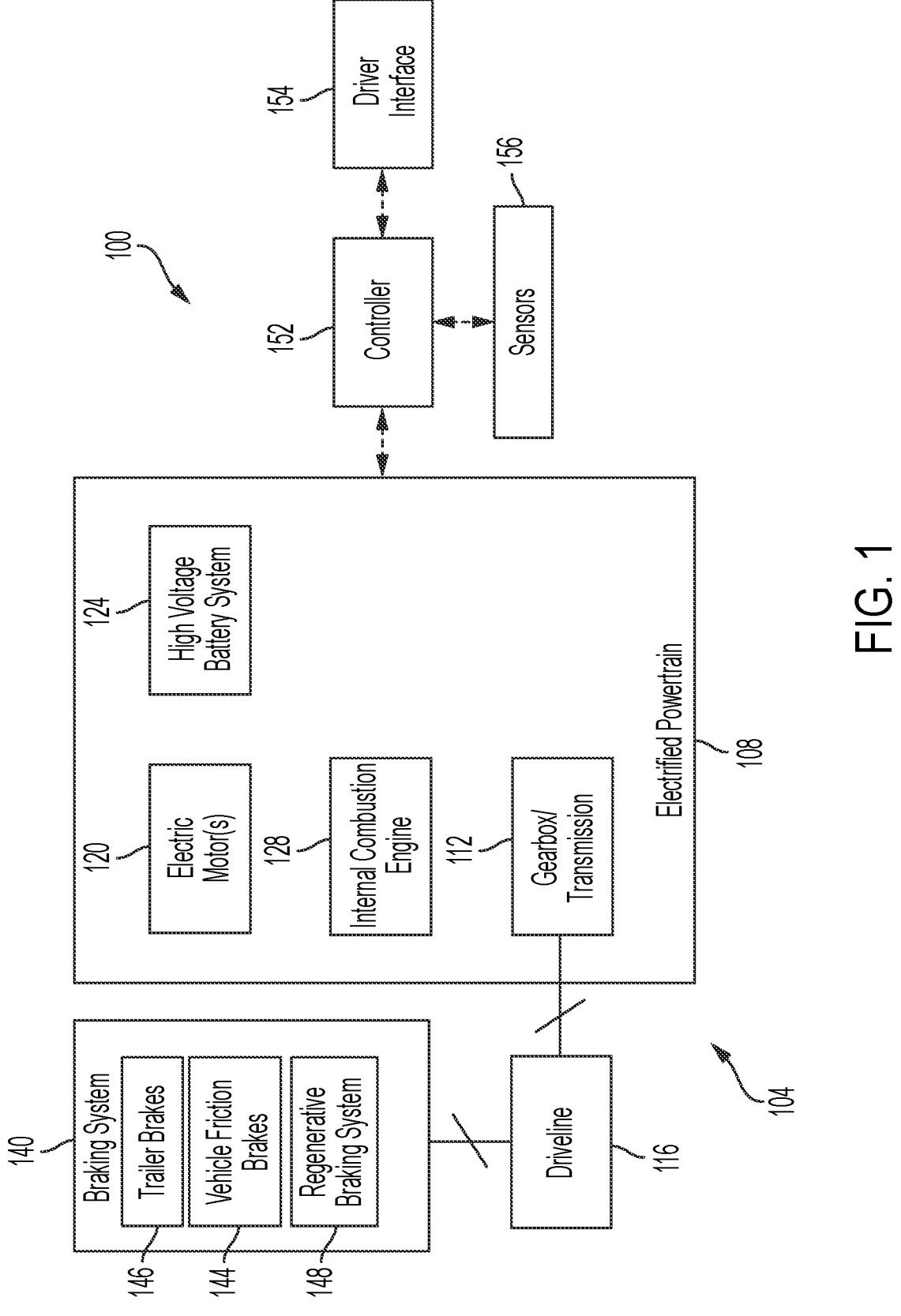
FIG. 1 is a functional block diagram of an electrified vehicle with an example electrified powertrain with a dynamic braking system according to the principles of the present application.

Referring now to FIG. 1, a functional block diagram of an electrified vehicle 100 having an example dynamic braking system 104 according to the principles of the present application is illustrated. The electrified vehicle 100 could be any suitable electrified vehicle (e.g., plug-in hybrid electric vehicle (PHEV), battery electric vehicle (BEV), etc.) configured for recharging. While a battery-equipped electrified vehicle 100 is shown and generally described herein, it will be appreciated that the techniques of the present application are not limited to battery systems and are applicable to any suitable energy storage system.

The electrified vehicle 100 is powered by an electrified powertrain 108 that generates and transfers drive torque (e.g., via a gearbox/transmission 112) to a driveline 116. The electrified powertrain 108 includes one or more electric motors 120 powered by a high voltage battery system 124 and an optional internal combustion engine 128 configured to combust a mixture of air and fuel (diesel, gasoline, etc.). In other words, as the one or more electric motors 120 are operated to generate drive torque (torque consumer mode), the SOC of the high voltage battery system 124 is depleted.

The electrified powertrain 108 also includes a brake system 140 comprising a conventional vehicle friction braking system 144, a trailer friction braking system 146 (when coupled to a braking capable trailer), and a regenerative braking system 148. The vehicle friction braking system 144 is configured to brake one or more vehicle wheels (not shown), and the trailer friction braking system 146 is configured to brake one or more trailer wheels (not shown). The regenerative braking system 148 is configured to brake (decelerate) the driveline 116 and convert the kinetic energy to electrical energy, such as for recharging the high voltage battery system 124.

A supervisory controller 152, such as an electric vehicle control unit (EVCU), controls operation of the electrified vehicle 100, including controlling the electrified powertrain 108 to satisfy a torque request (e.g., via a driver interface 154, such as an accelerator pedal). It will be appreciated that the torque request may not come directly from the driver, but instead could be a torque request generated by an advanced driver assistance (ADAS) or autonomous driving system. The controller 152 is also configured to receive information from a set of sensors 156 to control operation of the electrified vehicle 100. Non-limiting examples of the set of sensors 156 include vehicle speed sensors, electrified powertrain speed/temperature/electrical parameter/SOC sensors, and accelerometers. Such sensors 156 are utilized to facilitate determining a regenerative braking capacity of the electric propulsion system 108. The controller 152 is also configured to perform dynamic regenerative braking control techniques of the present application during a towing operation, which will now be described in greater detail with reference to FIGS. 2 and 3.

Figure 2:
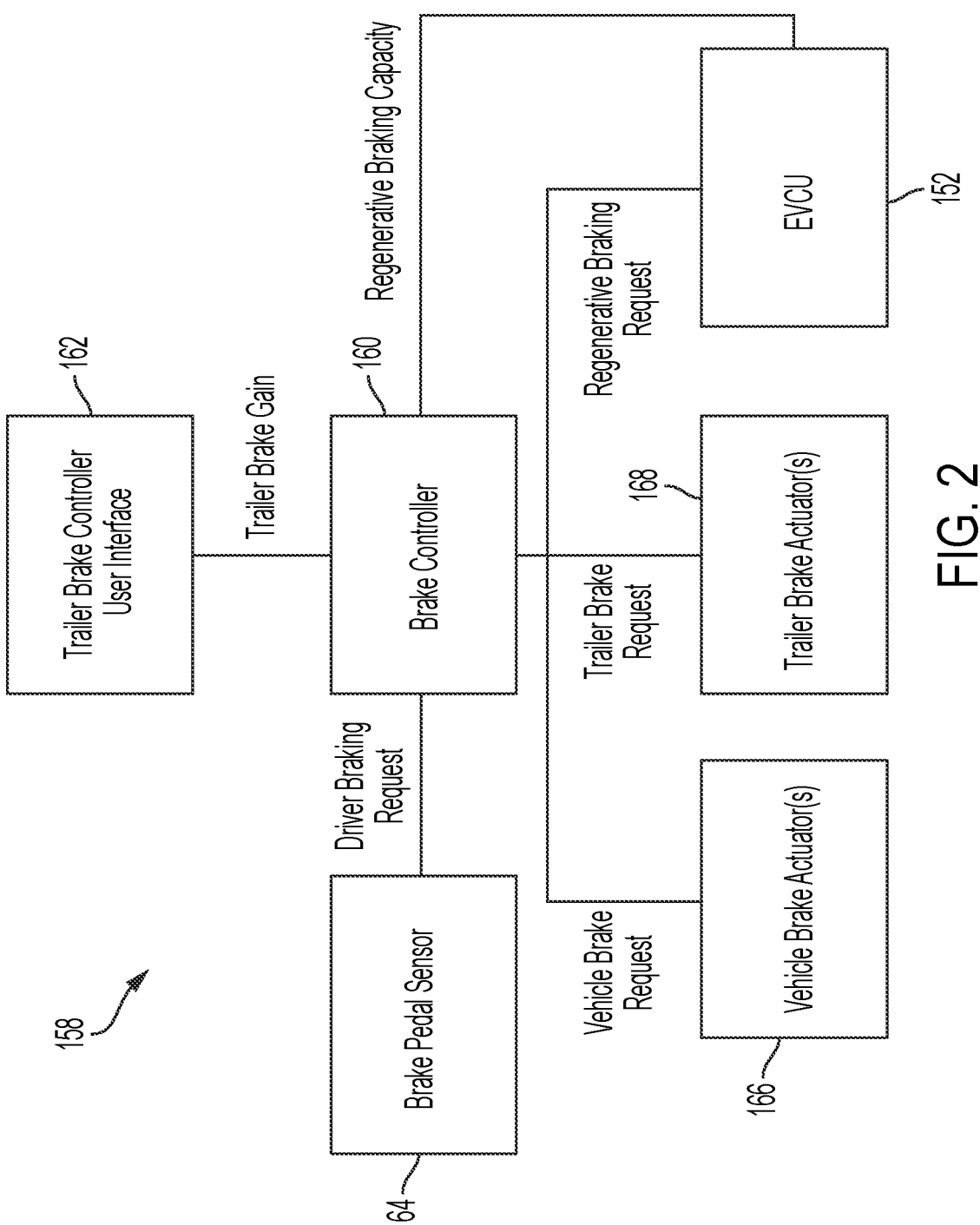
FIG. 2 is a schematic diagram of an example architecture of the dynamic braking system according to the principles of the present application.

With reference now to FIG. 2, an example architecture 158 of the braking system 140 according to the principles of the present application is presented. As shown, the braking system 140 is configured to communicate with the supervisory controller 152, which is in signal communication with and is configured to coordinate interaction between powertrain modules, sensors, and other electrical and electronic modules or components. As described herein in more detail, the braking system 140 is configured to dynamically control the vehicle's trailer brake gain based on the regenerative braking capacity of the vehicle.

In the example embodiment, the controller 152 is in signal communication with a brake controller 160, which is in signal communication with a trailer brake controller user interface 162, a brake pedal sensor 164, one or more vehicle brake actuators 166, and one or more trailer brake actuators 168.

In the example embodiment, the brake controller 160 is configured to control braking of the braking system 140, including the vehicle friction brakes 144, the trailer friction brakes 146, and the regenerative braking system 148. The brake controller 160 is configured to receive one or more signals from the trailer brake controller user interface 162, such as via a touchscreen, button, dial, etc. Example signals include a Trailer Brake Gain indicating a user selectable trailer braking effort, typically expressed by an arbitrary scale (e.g., 1-10).

In the example implementation, the brake controller 160 is configured to receive one or more signals from the brake pedal sensor 164 indicating a Driver Braking Request, which represents an interpreted braking torque request from the brake pedal. The brake controller 160 is also configured to receive one or more signals from controller 152 indicating a Regenerative Braking Capacity, which in one example represents a real-time calculation of the electrified propulsion system's ability to provide a regenerative braking torque. In the example embodiment, the Regenerative Braking Capacity considers a plurality of component and system constraints such as, for example, HV battery power limit, electric motor temperature, HV battery state of charge, HV battery temperature, individual battery cell voltages, battery pack voltage, etc. In one example, the "capacity" describes the ability of the propulsion system to apply a retarding torque with the electric motor(s). This capacity may be represented as a torque (Nm), but may be represented in other dimensions, such acceleration, force, etc. The capacity is dynamic and adjusts in real-time.

The brake controller 160 is configured to send one or more brake request signals to the vehicle brake actuator(s) 166, the trailer brake actuator(s) 168, and the controller 152. More specifically, the brake controller 160 is configured to send a Vehicle Brake Request to the vehicle brake actuators 166, a Trailer Brake Request to the trailer brake actuators 168, and a Regenerative Braking Request to the controller 152. In the example embodiment, the Vehicle Brake Request indicates an arbitrated component of total braking demand that is to be satisfied by the vehicle friction brakes 144. The Trailer Brake Request indicates an arbitrated component of total braking demand that is to be satisfied by the trailer friction brakes 146. The Regenerative Braking Request indicates an arbitrated component of total braking demand that is to be satisfied by the regenerative braking system 148.

Figure 3:
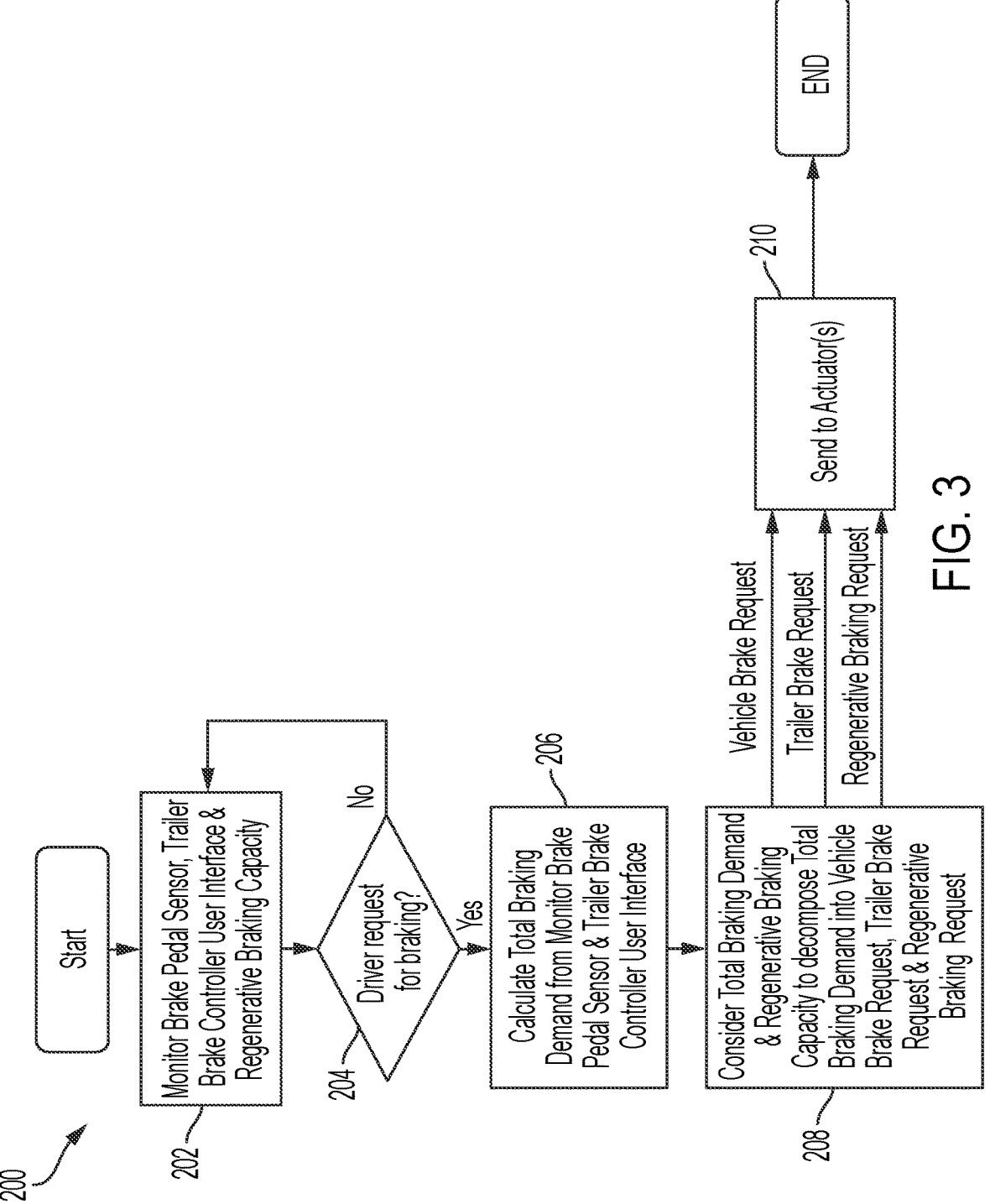
FIG. 3 is a flow diagram of an example control method for the dynamic braking system according to the principles of the present application.

Referring now to FIG. 3, a flow diagram of an example braking control method 200 for an electric vehicle according to the principles of the present disclosure is illustrated. While the electric vehicle 100 and the components of FIGS. 1-2 are specifically referenced for illustrative/descriptive purposes, it will be appreciated that the method 200 could be applicable to any suitably configured electric vehicle.

At step 202, the brake controller 160 ("control") monitors the trailer brake user interface 162, the brake pedal sensor 164, and the Regenerative Braking Capacity from controller 152. At step 204, control determines if there is a driver request for braking from the brake pedal sensor 164. If no, control returns to step 202. If yes, control proceeds to step 206.

At step 206, control determines the total braking demand based on the Driver Braking Request signal from brake pedal sensor 164 and the user selected Trailer Brake Gain from the trailer user interface 162. In one example, the total braking demand is the sum of the braking demand from the brake pedal input and the trailer brake controller. The brake controller interprets the brake pedal position and other environmental parameters to calculate a driver brake demand.

At step 208, control determines the Vehicle Brake Request, Trailer Brake Request, and Regenerative Braking Request based on the total braking demand and the vehicle regenerative braking capacity. In one example, the Regenerative Braking Request is equal to the Regenerative Braking Capacity, the Total Friction Braking is equal to the Total Braking Demand minus the Regenerative Braking Request, the Vehicle Brake Request equals the Total Friction Braking multiplied by the proportion to be satisfied by the vehicle brakes, and the Trailer Brake Request equals the Total Friction Braking multiplied by the proportion to be satisfied by the trailer brakes.

In another example, control first fulfills all braking demand, if possible, with the Regenerative Braking Request. This maximizes energy regen and reduces wear on the vehicle/trailer brakes. If the regenerative braking capacity cannot fulfil the total braking demand, control first apportions the full Regenerative Braking Request available (as limited by the regenerative braking capacity). The remaining braking demand is then satisfied by the Vehicle Brake Request and the Trailer Brake Request utilizing the vehicle friction brakes 144 and the trailer friction brakes 146. In one example, to reduce wear on the vehicle friction brakes 144, brake controller 160 prioritizes use of the trailer friction brakes 146 to meet the total brake demand before finally utilizing the vehicle friction brakes 144 if necessary. In another example, the distribution between the vehicle friction brakes 144 and trailer friction brakes 146 may be based on monitored parameters related to vehicle stability.

Figure 4:
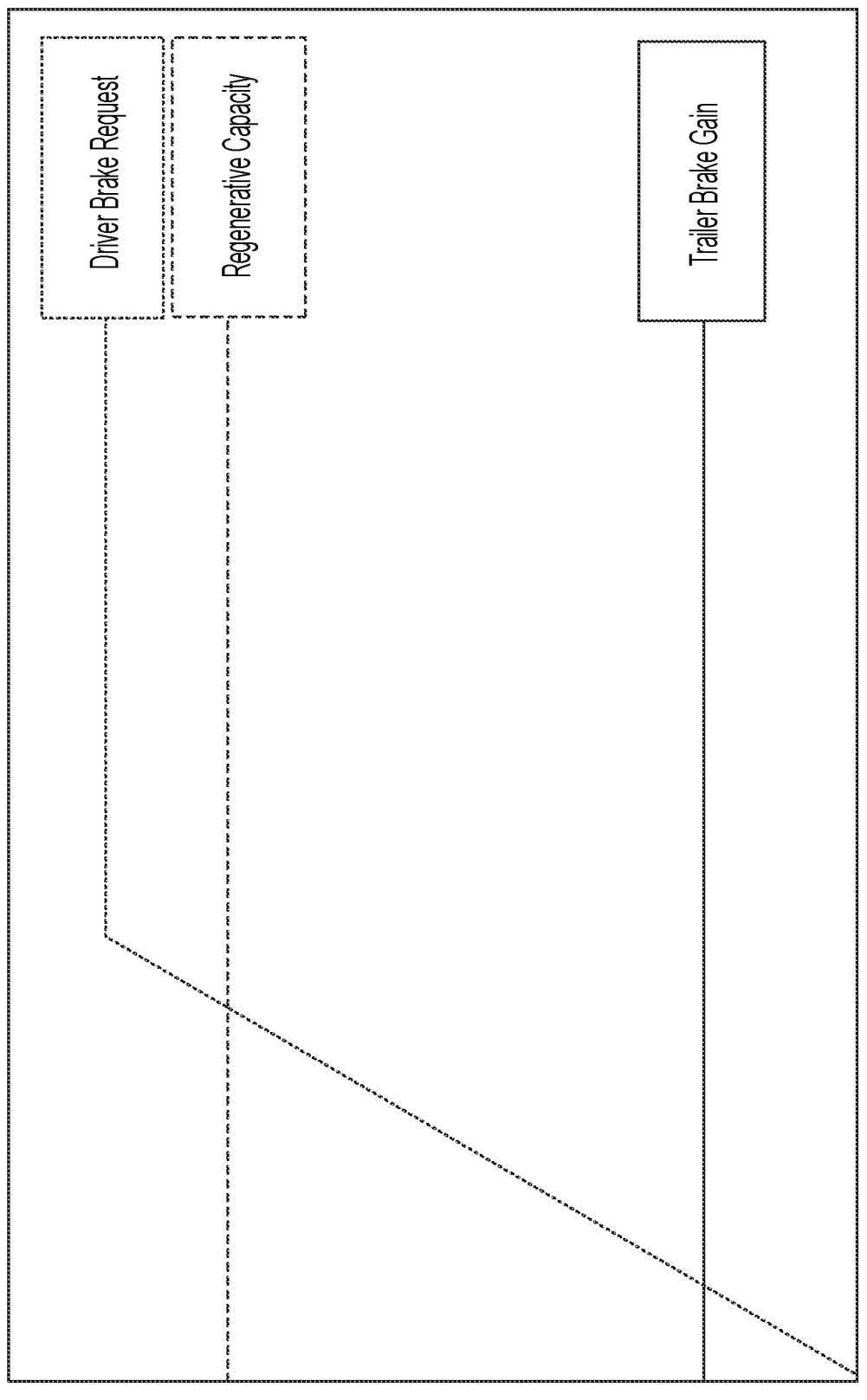
FIG. 4 is a graph of an example control of the dynamic braking system of FIG. 2, according to the principles of the present application.
Figure 5:
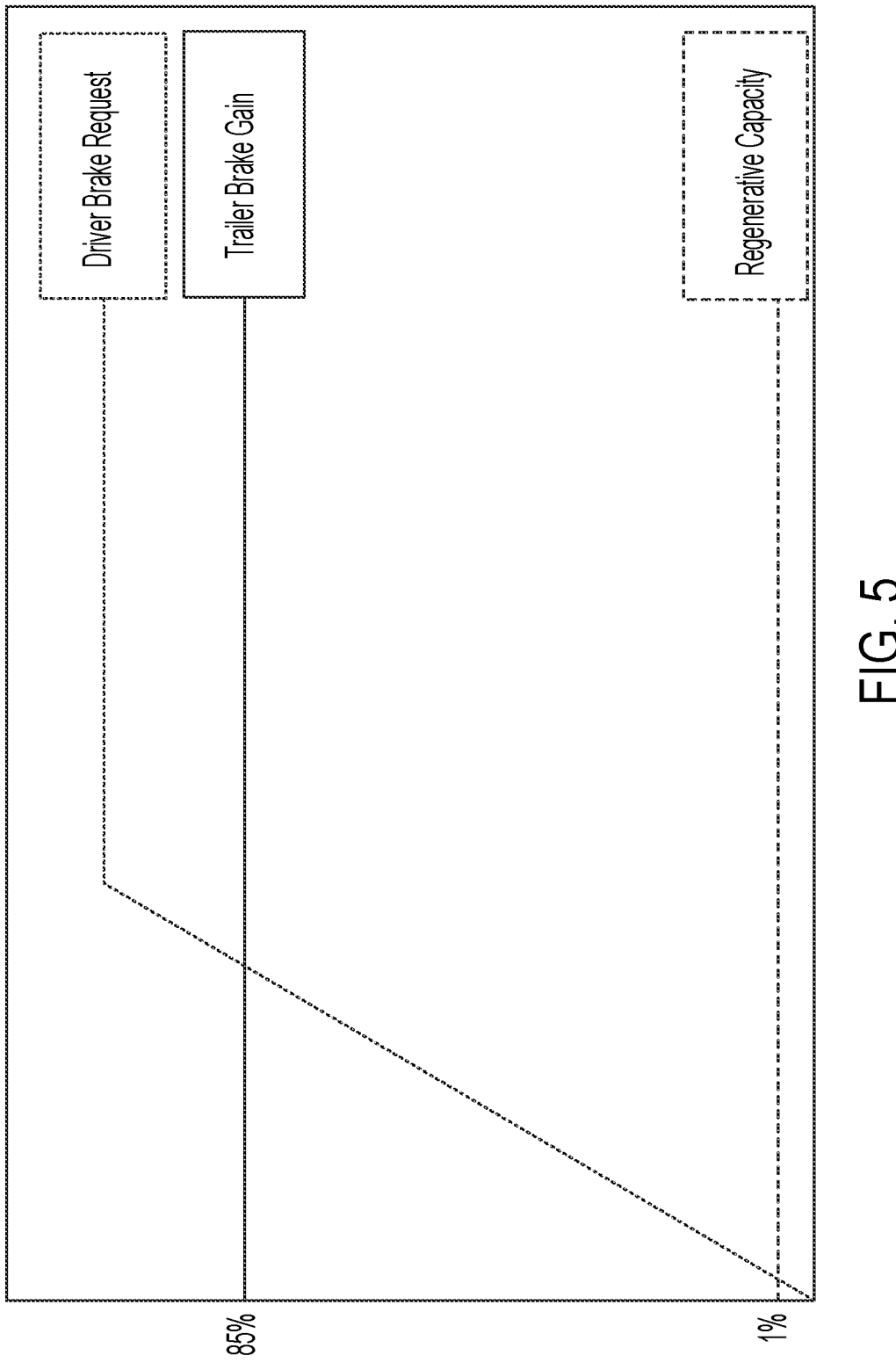
FIG. 5 is a graph of another example control of the dynamic braking system of FIG. 2, according to the principles of the present application.
Figure 6:
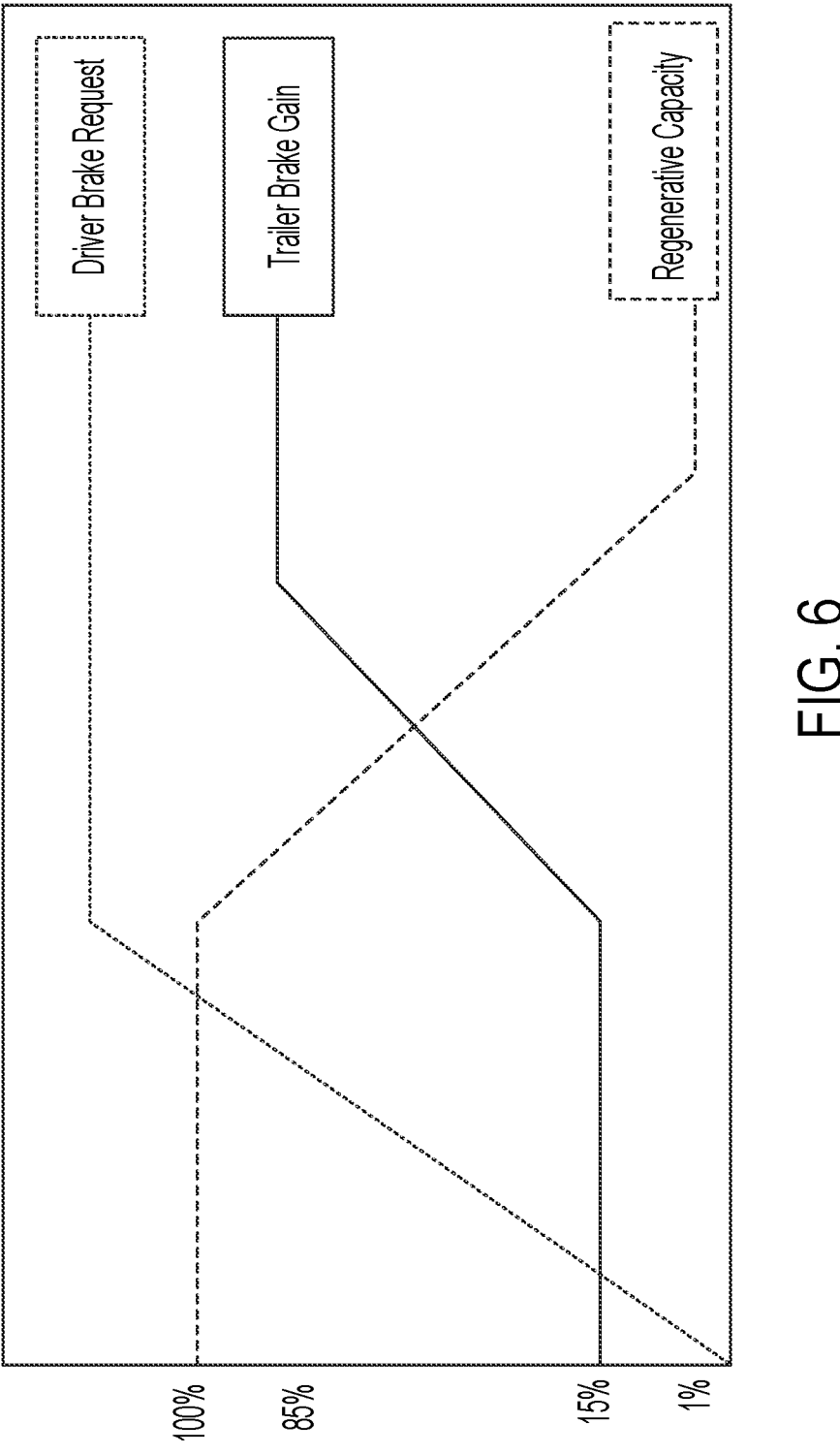
FIG. 6 is a graph of yet another example control of the dynamic braking system of FIG. 2, according to the principles of the present application.

FIGS. 4-6 illustrate examples of the dynamic brake control based on regen braking capacity. For example, as shown in FIG. 4, if regenerative braking capacity is high, control sets the Trailer Brake Request (trailer brake gain) at a minimum level and satisfies as much of the total braking demand as possible with the Regenerative Braking Request. In contrast, as shown in FIG. 5, if the regenerative braking capacity is low or unavailable (e.g., battery fully charged, system component outside allowable limits, etc.), control sets the Trailer Brake Request (trailer brake gain) at a maximum level. As shown in FIG. 6, as the regenerative braking capacity fluctuates, controller 152 automatically and dynamically adjusts the Trailer Brake Request to make up the demand that cannot be satisfied by the Regenerative Braking Request.

At step 210, control sends the determined Vehicle Brake Request to vehicle brake actuators 166, the determined Trailer Brake Request to trailer brake actuators 168, and the Regenerative Braking Request to the controller 152. In this way, the dynamic braking system 104 overrides the manual trailer brake gain setting, based on the regen brake capacity of the vehicle, to thereby maximize energy recovery and minimize vehicle/trailer brake wear.

It will be appreciated that the term "controller" or "module" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A dynamic braking system for an electrified vehicle having a high voltage (HV) battery system and an electric propulsion system, the dynamic braking system comprising:
   a regenerative braking system configured to generate electrical energy to recharge the HV battery system;
   a vehicle controller configured to monitor and control the regenerative braking system to selectively perform a regenerative braking operation;
   a vehicle brake actuator configured to selectively actuate one or more vehicle friction brakes; and
   a brake controller in signal communication with the vehicle brake actuator and configured for signal communication with a trailer brake actuator to selectively actuate one or more trailer friction brakes, wherein the brake controller is programmed to:
   receive a driver braking request;
   receive a signal indicating a regenerative braking capacity of the electric propulsion system;
   based on the driver braking request and the regenerative braking capacity, automatically adjust a trailer brake gain to (i) maximize energy recovery via regenerative braking and (ii) reduce brake wear;
   first satisfy a maximum amount of the driver braking request via the regenerative braking as allowed by the regenerative braking capacity;

then satisfy a maximum amount of any remaining driver braking request via the one or more trailer friction brakes; and
   finally satisfy any further remaining driver braking request via the one or more vehicle friction brakes.

2. The dynamic braking system of claim 1, wherein the brake controller is programmed to:
   (i) automatically increase a trailer brake gain when the regenerative braking capacity decreases, to thereby reduce a vehicle brake pad wear; and
   (ii) automatically decrease the trailer brake gain when the regenerative braking capacity increases, to thereby maximize energy recovery via regenerative braking and reduce a trailer brake pad wear.

3. The dynamic braking system of claim 1, wherein the brake controller is programmed to:
   continuously update the driver braking request and the regenerative braking capacity; and
   continuously adjust the trailer brake gain to continuously maximize energy recovery via regenerative braking.

4. The dynamic braking system of claim 1, further comprising a user interface in signal communication with the brake controller,
   wherein the brake controller is configured to receive, from the user interface, one or more signals indicating a user selected brake gain.

5. The dynamic braking system of claim 4, wherein the brake controller is configured to override the user selected brake gain when automatically adjusting the trailer brake gain.

6. The dynamic braking system of claim 1, wherein the brake controller is further programmed to continuously adjust a regenerative braking level of the regenerative braking system, to further maximize the power regeneration of the HV battery system via the regenerative braking system, based on regenerative braking capacity.

7. A dynamic braking system for an electrified vehicle having a high voltage (HV) battery system and an electric propulsion system, the dynamic braking system comprising:
   a regenerative braking system configured to generate electrical energy to recharge the HV battery system;
   a vehicle controller configured to monitor and control the regenerative braking system to selectively perform a regenerative braking operation;
   a vehicle brake actuator configured to selectively actuate one or more vehicle friction brakes;
   a brake controller in signal communication with the vehicle brake actuator and configured for signal communication with a trailer brake actuator to selectively actuate one or more trailer friction brakes; and
   a brake pedal sensor in signal communication with the brake controller, wherein the brake controller is configured to receive one or more signals from the brake pedal sensor indicating the driver braking request, which represents a total brake demand,
   wherein the brake controller is programmed to:
   receive a driver braking request;
   receive a signal indicating a regenerative braking capacity of the electric propulsion system;
   based on the driver braking request and the regenerative braking capacity, automatically adjust a trailer brake gain to (i) maximize energy recovery via regenerative braking and (ii) reduce brake wear;
   send a vehicle brake request to the vehicle brake actuator to generate a first portion of the total brake demand;

send a trailer brake request to the trailer brake actuator to generate a second portion of the total brake demand; and send a regenerative braking request to the regenerative braking system to generate a third portion of the total brake demand.

8. A control method for a dynamic braking system for an electrified vehicle having a high voltage (HV) battery system and an electric propulsion system, the dynamic braking system including a regenerative braking system and a vehicle brake actuator, the method comprising:

receiving, by a brake controller, a driver braking request;

receiving, by the brake controller, a signal indicating a regenerative braking capacity of the electric propulsion system; and based on the driver braking request and the regenerative braking capacity, automatically adjusting, by the brake controller, a trailer brake gain to maximize energy recovery via regenerative braking, and reduce brake wear, wherein said automatically adjusting a trailer brake gain includes:

first satisfying, by the brake controller, a maximum amount of the driver braking request via the regenerative braking as allowed by the regenerative braking capacity;

then satisfying, by the brake controller, a maximum amount of any remaining driver braking request via one or more trailer friction brakes; and finally satisfying, by the brake controller, any further remaining driver braking request via one or more vehicle friction brakes.

9. The method of claim 8, wherein said automatically adjusting a trailer brake gain further includes:

automatically increasing, by the brake controller, a trailer brake gain when the regenerative braking capacity decreases, to thereby reduce a vehicle brake pad wear; and automatically decreasing, by the brake controller, the trailer brake gain when the regenerative braking capacity increases, to thereby increase energy recovery via regenerative braking, and reduce a trailer brake pad wear.

10. The method of claim 8, further comprising:

continuously updating the driver braking request and the regenerative braking capacity; and continuously adjusting, by the brake controller, the trailer brake gain to continuously maximize energy recovery via regenerative braking.

11. The method of claim 8, further comprising:

receiving, by the brake controller, one or more signals from a brake pedal sensor indicating the driver braking request, which represents a total brake demand.

12. The method of claim 11, further comprising:

sending, by the brake controller, a vehicle brake request to the vehicle brake actuator to generate a first portion of the total brake demand;

sending, by the brake controller, a trailer brake request to a trailer brake actuator to generate a second portion of the total brake demand; and sending, by the brake controller, a regenerative braking request to the regenerative braking system to generate a third portion of the total brake demand.

13. The method of claim 8, further comprising:

receiving, by the brake controller and from a user interface, one or more signals indicating a user selected brake gain.

14. The method of claim 13, further comprising overriding, with the brake controller, the user selected brake gain when automatically adjusting the trailer brake gain.

15. The method of claim 8, further comprising:

continuously adjusting, by the brake controller and based on the regenerative braking capacity, a regenerative braking level of the regenerative braking system, to further maximize the power regeneration of the HV battery system via the regenerative braking system.

* * * * *